Aug. 15, 1961 T. E. SORENSEN ET AL 2,996,276
DIE CUT PALLET AND METHOD OF MAKING
Filed Aug. 21, 1958 4 Sheets-Sheet 1

INVENTORS
THOR E. SORENSEN
LEWIS R. LIGHTNER
BY
Charles P. Bauer
ATTORNEY

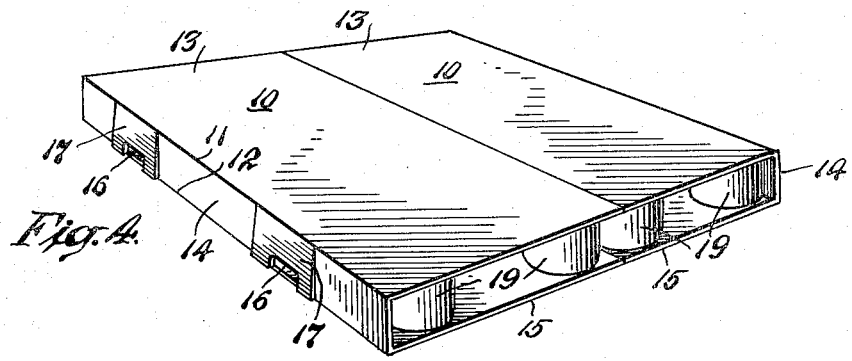
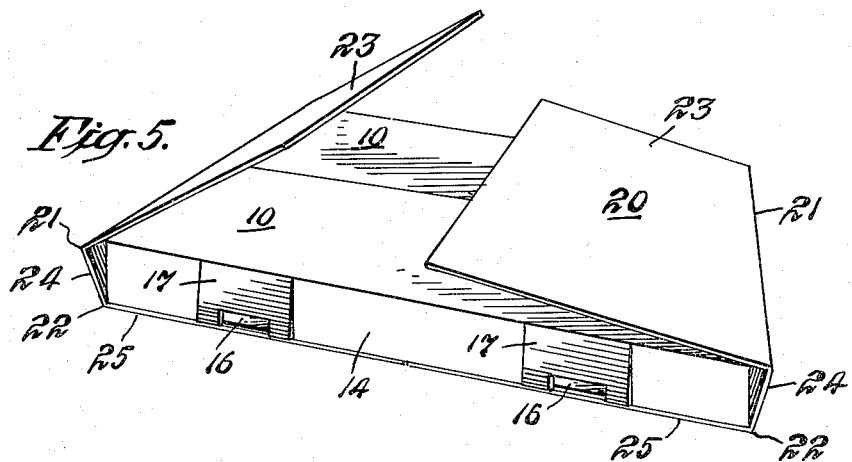
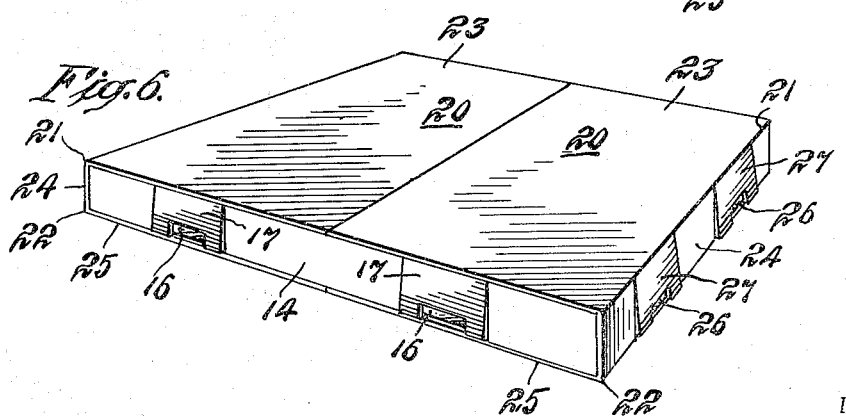
INVENTORS
THOR E. SORENSEN
LEWIS R. LIGHTNER
BY
Charles P Bauer
ATTORNEY INVENTORS
THOR E. SORENSEN
LEWIS R. LIGHTNER
BY Charles P. Bauer
ATTORNEY Aug. 15, 1961     T. E. SORENSEN ET AL     2,996,276
DIE CUT PALLET AND METHOD OF MAKING
Filed Aug. 21, 1958     4 Sheets-Sheet 4

INVENTORS
THOR ERNEST SORENSEN
LEWIS R. LIGHTNER

BY *Charles P Bauer*

ATTORNEY

United States Patent Office 2,996,276
Patented Aug. 15, 1961

2,996,276
DIE CUT PALLET AND METHOD OF MAKING
Thor Ernest Sorensen and Lewis Richard Lightner, Savannah, Ga., assignors to Union Bag-Camp Paper Corporation, New York, N.Y., a corporation of Virginia
Filed Aug. 21, 1958, Ser. No. 756,395
4 Claims. (Cl. 248—120)

The present invention relates to improvements in pallets. More particularly it pertains to a die cut paper pallet and the method of making.

An object of the present invention is to provide a paper pallet which is stronger and sturdier than other paper pallets now in use. Such strength and sturdiness will in many cases permit re-use of the pallet which is not possible with other paper pallets. The pallet of the present invention provides a flat top or platform which allows for better stacking of the load.

It is a further object of the invention to provide a pallet with improved die cut fork openings having projecting flaps to give additional protection to the load from the steel strapping.

Another object of the invention is to provide a pallet of the character stated, which is simple in design, rugged in construction, and economical to manufacture.

Another object of the invention is to provide a method for making a sturdy and improved pallet in a simple and quick operation.

Other objects of the invention will in part be obvious and will in part appear hereinafter.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 4 is a perspective view showing two of the pallet half sections of FIGURE 3 placed side by side with the side panels on opposite ends;

FIGURE 5 is a view of the sections of FIGURE 4 placed within a tubular die cut sheet with the side panels covering the open ends of the sections;

FIGURE 6 is a perspective view of the completed pallet with the tubular sheet secured to the sections;

Figure 1:
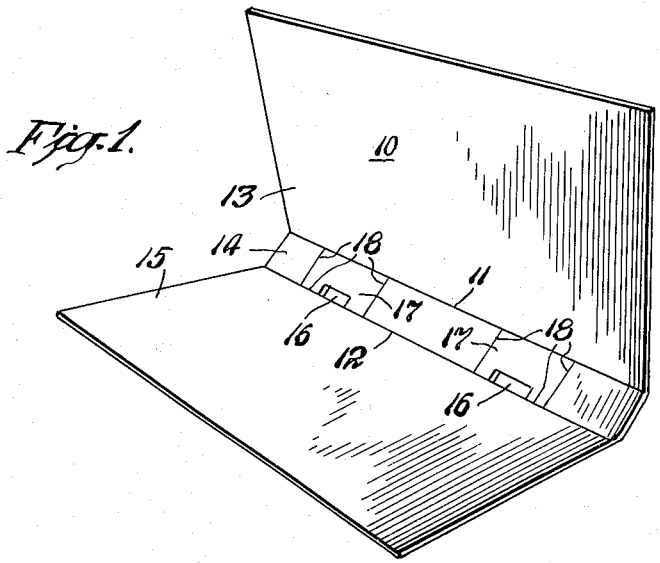
FIGURE 1 is a perspective view of a die cut sheet having a base, top and one side panel.

Referring more particularly to the drawings, FIGURE 1 shows a sheet 10 substantially rectangular in shape which is scored at spaced lines 11 and 12 to divide the sheet into a platform panel 13, a side panel 14, and a base panel 15. The side panel 14 has spaced die cut slots 16 and flaps 17, formed by cut scores 18 and hinged along the score line 11. The purpose of such slots and flaps will be described hereinafter. The sheet 10 may be made of corrugated board or other suitable fibrous board.

Figure 2:
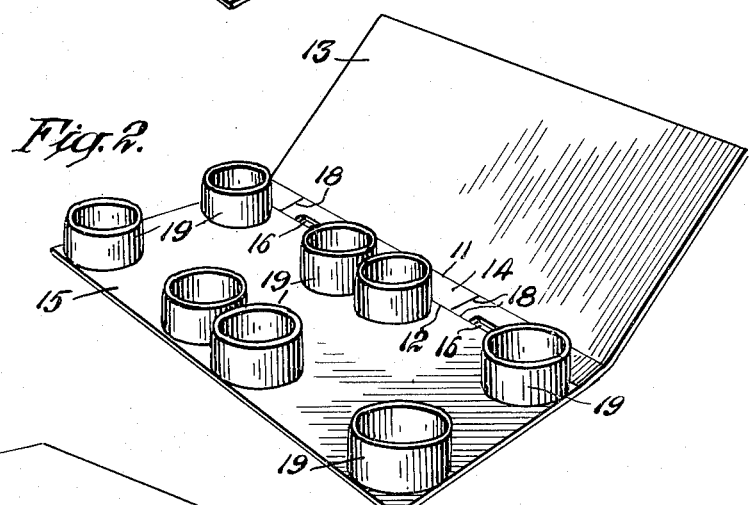
FIGURE 2 is a view of the sheet of FIGURE 1 with core supports secured to the base.
Figure 3:
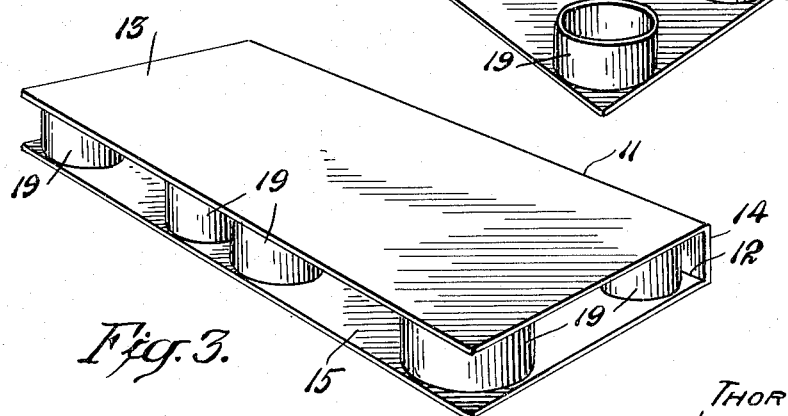
FIGURE 3 is a view of the sheet of FIGURE 2 with the top folded over and secured to the tops of the supports.

A plurality of supporting members 19 are secured to the base panel 15, as shown in FIGURE 2. Such members elevate the platform panel 13 above the base panel 15 when the sheet 10 is formed into the half pallet section shown in FIGURE 3. The members are spaced to define therebetween openings for lift truck entry beneath said platform. It should be noted that the slots 16 and flaps 17 are positioned to line up with the openings running in the direction of the side panel 14. The supporting members shown herein are of hollow tubular construction but it will be understood that other shapes and forms may be used to support the platform. While wound paper cores have proven satisfactory, rigid supports of wood, plywood, pressed wood, or other suitable material will also support the load carried on the pallet. The greatest strength is achieved by adhesively securing the supporting members to both the base panel 15 and the platform panel 13. However, because of the construction of the pallet of the present invention, it is possible to make a satisfactory pallet by securing the members to either the base panel or the platform panel.

Another half pallet section similar to the one just described is made in the same manner and the two sections are butted together as shown in FIGURE 4. It will be seen that the side panels of each section are opposite and away from each other so that the two rectangular sheets 10 when butted together in this manner form a tube open at each end with the supporting members sandwiched in between the platform panel 13 and the base panel 15.

Figure 9:
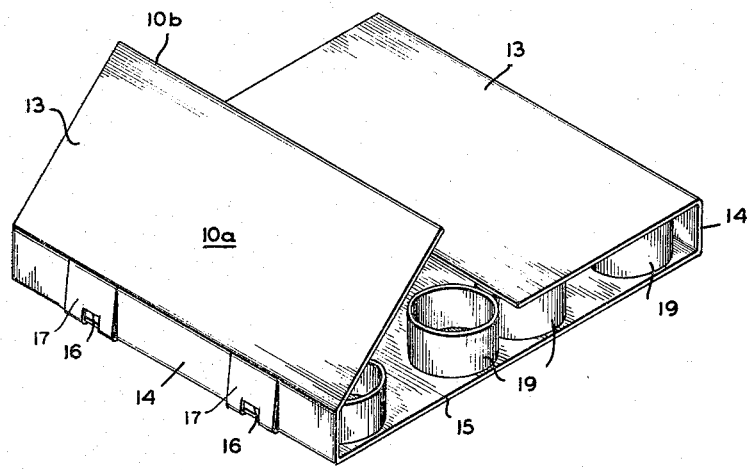
FIG. 9 is a perspective view similar to FIG. 4 with the side, top and bottom panels formed of a single sheet.
Figure 10:
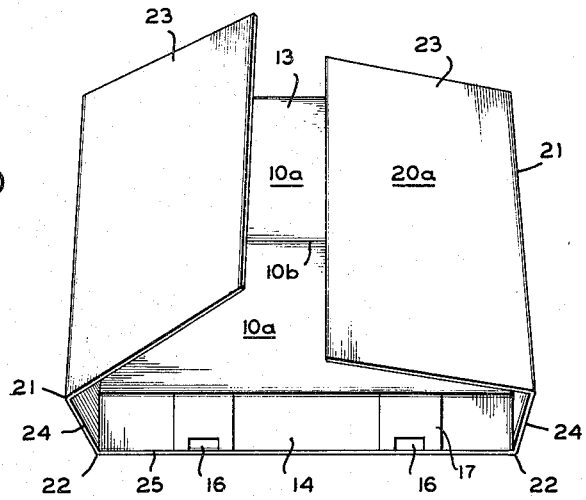
FIG. 10 is a perspective view similar to FIG. 5 but illustrating a single tubular covering sheet.

Two additional sheets 20 are shaped and scored substantially the same as the sheet 10. In each the spaced score lines 21 and 22 divide the sheet into a platform panel 23, a side panel 24 and a base panel 25. The side panel is similarly provided with spaced die cut slots 26 and flaps 27 which line up with the fork openings formed by the spaced supporting members. The sheets 20 are folded over the open ends of the two pallet sections described above and butted together to form a tube so that the axes of the two tubes are at right angles to each other, as shown in FIGURE 5. The base panels 25 are secured adhesively to the base panels 15 and the platform panels 23 are similarly secured to the base panels 13. This results in the pallet shown in FIGURE 6 with all sides closed and the platform and base smooth and flat. Although it simplifies handling and assembling to make the two tubes of two sheets 10 and two sheets 20, it will be evident that the tubes could be formed from single sheets. In the case of the first tube the supporting members would be encased by a single sheet 10a as shown in FIGURE 9 but with only one seam 10b, whereas the second tube formed of a single sheet 20a would appear as in FIGURE 10 likewise with only one seam.

Figure 7:
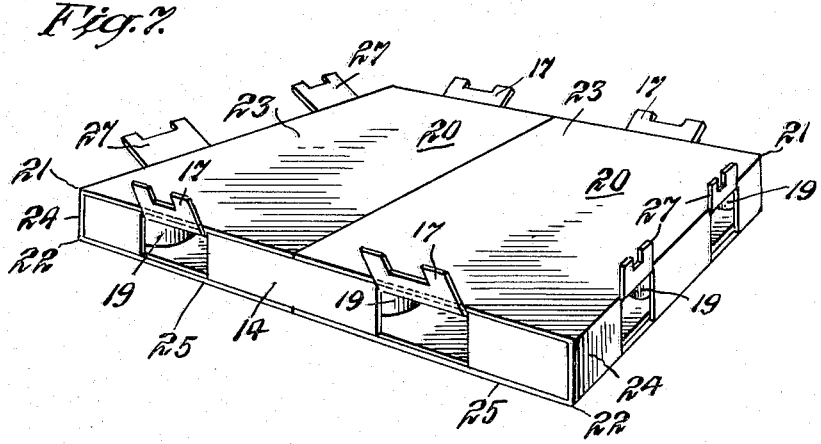
FIGURE 7 is a perspective view of the pallet of FIGURE 6 with the cut out portions pulled out of the fork openings.
Figure 8:
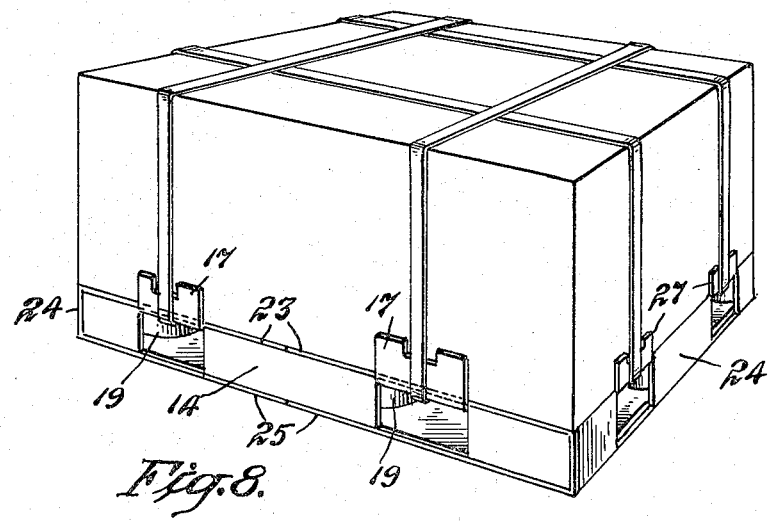
FIGURE 8 is a perspective view of the pallet showing a load strapped in place.

When this pallet is to be used the flaps 17 and 27 are pulled out by means of the slots 16 and 26 and turned upwardly to expose the fork openings, as shown in FIGURE 6. After the load has been stacked on the pallet, the steel strapping is run through the openings and around the load as shown in FIGURE 7. It should be noted that the upturned flaps provide protection to the load from the steel strapping. Although the die cut slots 16 and 26 are shown as extended horizontally to the limits of the cut scores, it will be understood that the slots can be made smaller or larger as long as they provide a means for gripping the flaps and pulling them out of the fork openings.

Thus it will be apparent that the herein disclosed invention provides a new and useful pallet and an improved method of making a pallet. It is particularly adapted to carry a heavy load, it provides protection to the load from the steel strapping, it has a much better appearance than other paper pallets, and it is simple to assemble.

Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A reuseable pallet comprising a substantially rectangular sheet folded into a first tubular section having a platform, a base, opposite open ends and opposite side panels, supporting members secured between the platform and base and defining passageways for lift truck fork entry beneath the said platform, a substantially rectangular sheet folded into a second tubular section having a platform, a base, opposite open ends and opposite side panels, said sections being positioned and secured together by folding the opposite side panels of said second tubular section over the open ends of said first tubular section and the bases and platforms, respectively, of each section adhesively secured with the axis of said first tubular section being at right angles to the axis of said second tubular section and the platforms superimposed and the bases superimposed and at least two of the opposite side panels being provided with openings in line with said passageways for insertion of forks.

2. The pallet of claim 1 in which flaps are hinged above the said openings in the side panels which flaps can be moved out of position for insertion of the forks into passageways.

3. A reuseable pallet comprising two inner half sections placed in side-by-side relation to form a first tubular section, each half section comprising a substantially rectangular sheet folded to provide a platform, base and side panel, supporting members secured between the platform and base panels and defining passageways for lift truck fork entry beneath the platform panels, two outer half sections each comprising a substantially rectangular sheet folded to provide a platform, base and side panel, the outer sections being placed in side-by-side relation over and secured to the first tubular section to form a second tubular section by folding opposite side panels of said outer sections over the open ends of said inner sections with the bases and platforms, respectively, of said outer and inner sections being adhesively secured with the axis of said outer sections being at right angles to the axis of the first tubular section and with the platform panels of one superimposed on the platform panels of the other and the base panels of one superimposed on the base panels of the other and at least two of the opposite side panels being provided with openings in line with said passageways for insertion of forks with flaps hinged above said openings adapted to be turned upwardly to protect the load from steel strapping holding the load on the pallet and said flaps adapted to be turned down when said straps are cut and said load removed.

4. A method of making a reuseable pallet which comprises dividing a first substantially rectangular sheet into platform, base and opposite side panels, die cutting the side panels to define openings for lift truck fork entry, arranging supporting members on said base to define passageways for lift truck fork entry from at least two opposite sides, folding the sheet into a first tubular section and securing the supporting members between the base and platform, dividing a second substantially rectangular sheet into platform, base and opposite side panels, die cutting the side panels of said second sheet at positions to line up with said passageways between said supporting members for lift truck fork entry, folding the second sheet into a second tubular section and securing it around the first section with the axes of the sections at right angles and the platforms superimposed and the bases superimposed.

References Cited in the file of this patent
UNITED STATES PATENTS

| | | |
|---|---|---|
| 2,426,899 | Pantalone | Sept. 2, 1947 |
| 2,444,184 | Cahners | June 29, 1948 |
| 2,446,914 | Fallert | Aug. 10, 1948 |
| 2,528,413 | Budd | Oct. 31, 1950 |
| 2,571,748 | Newman | Oct. 16, 1951 |
| 2,576,715 | Farrell | Nov. 27, 1951 |
| 2,611,569 | Coleman | Sept. 23, 1952 |
| 2,741,361 | Klein | Apr. 10, 1956 |
| 2,894,671 | Nicholls | July 14, 1959 |